Patented Nov. 20, 1951

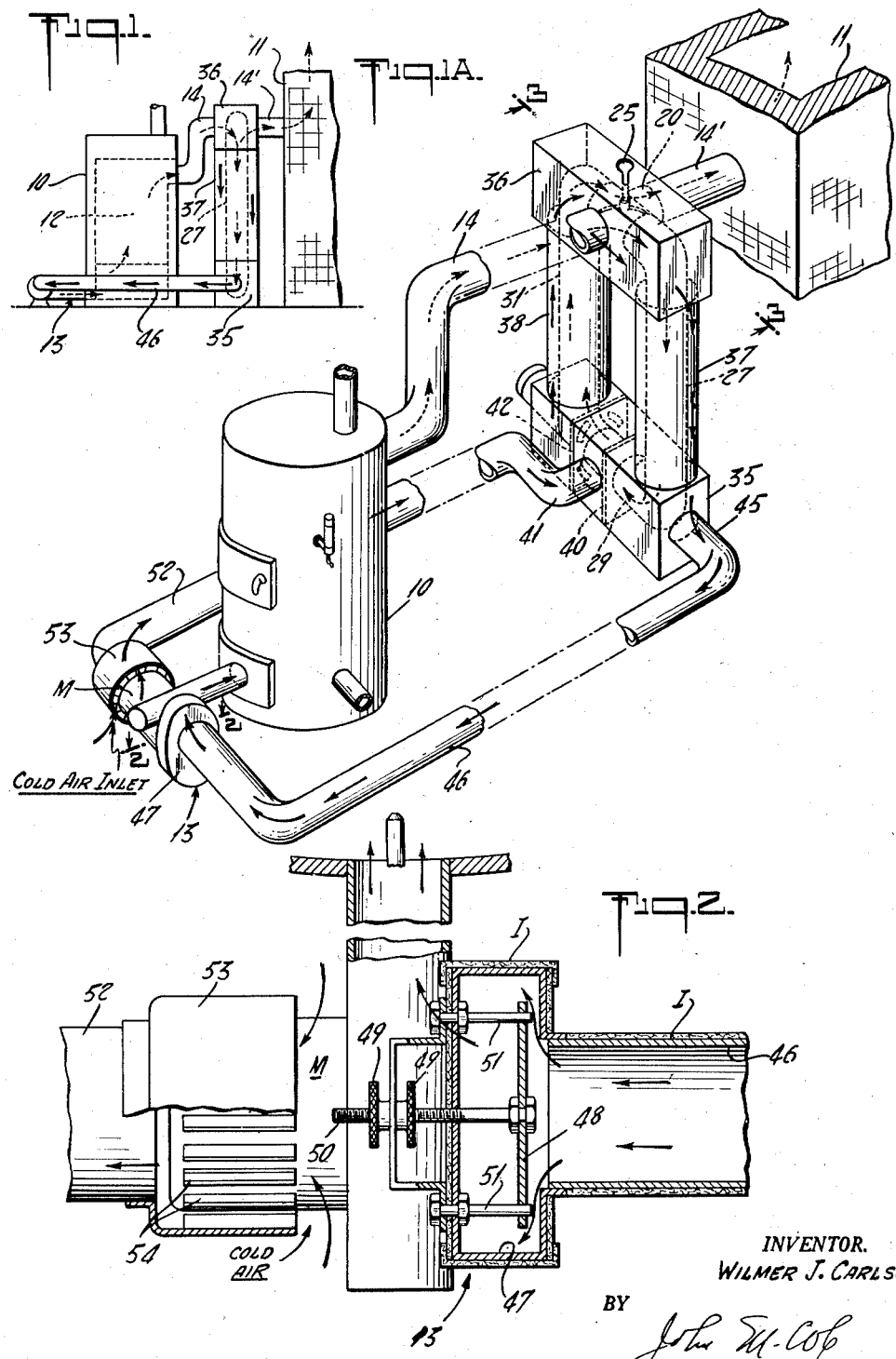

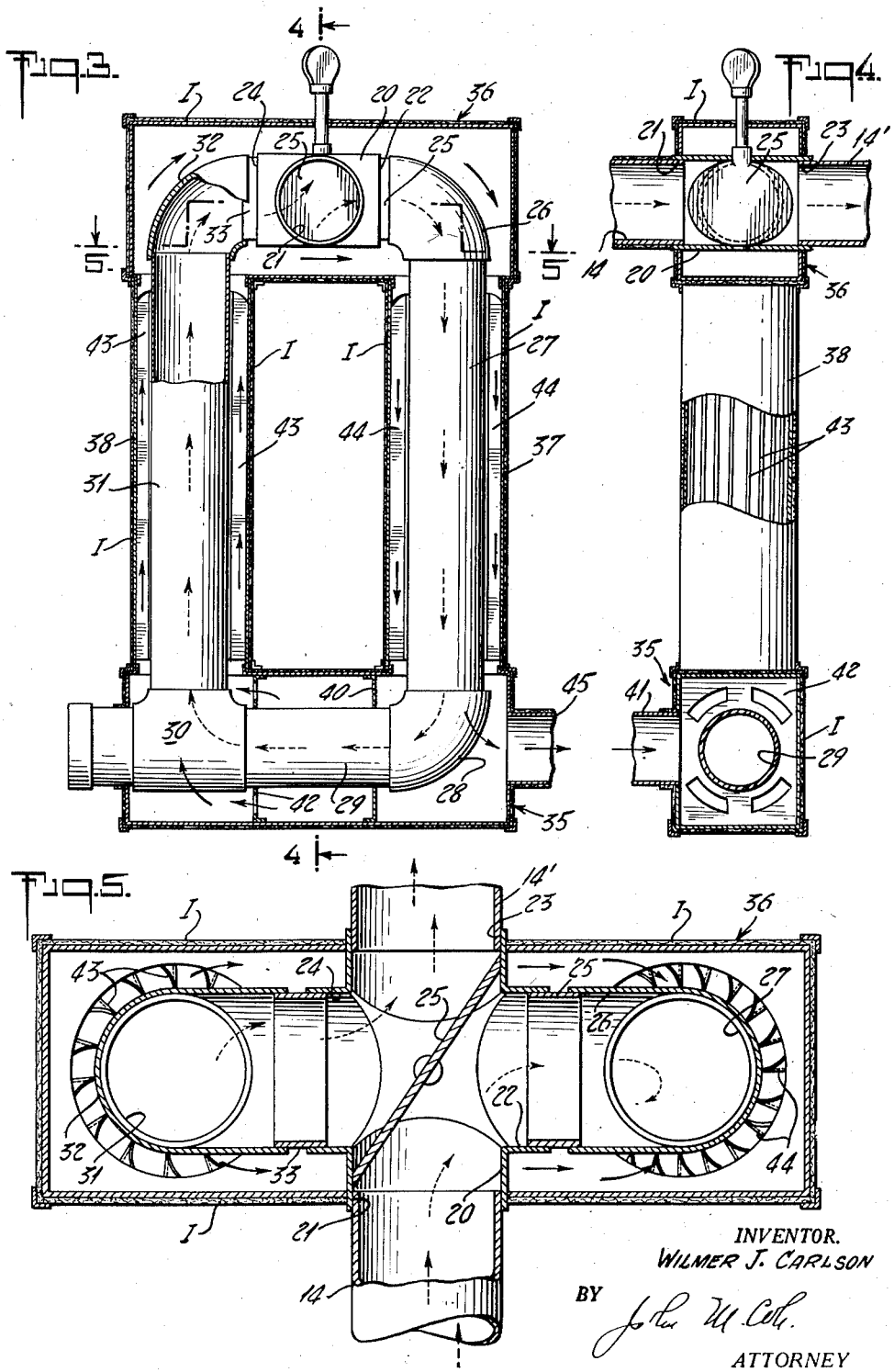

2,575,862

UNITED STATES PATENT OFFICE 2,575,862

ECONOMIZER FOR USE WITH OIL FIRED FORCED DRAFT DOMESTIC HEATING FURNACES

Wilmer J. Carlson, Valley Stream, N. Y.

Application March 11, 1950, Serial No. 149,189

4 Claims. (Cl. 158—4)

The present invention relates to economizers for use with oil fired forced draft domestic heating furnaces.

Oil fired forced draft heating furnaces used for heating homes and other small buildings are largely conversion heating plants, an existing coal fired furnace—whether hot air, hot water or steam—having been altered to operate with oil using some form of force draft oil burner such as pot, gun, rotary or wall flame. The installation of conversion burners has made it possible to obtain many advantages over those of the solid fuel fired furnace, but such conversion installations have been notoriously inefficient. Heating surfaces suitable for the slow continuous fire of the solid fuel are incapable of rapid and efficient transfer of heat to the heating medium, and the combustion products discharged have been at a very high temperature. Stack temperatures of upwards of 700° F. are common. The efficiency of such a heating plant is low. Furthermore, the heat remaining in the combustion chamber walls is rapidly dissipated up the stack on account of the natural draft which occurs during the no-fire or pilot fire period. This chilling of the furnace requires fuel for reheating it when heat is called for.

Not only are there an enormous number of very inefficient conversion installations in use, but there also exist a very large number of installations which differ but little from the coal furnace conversion jobs. They are assembly jobs wherein a burner suitable for general use and a boiler—more suitable for oil fuel than the boiler designed for coal firing, but not correlated in design to work with the burner—are installed in the house and connected to the chimney. Somewhat better efficiencies may be had, largely because of better boiler design, but still there is a stack temperature much in excess of what is needed to cause the products of combustion to rise under natural draft in the chimney, and the sweeping out of hot gases is the same.

Where properly designed boiler units are substituted for the conversion jobs or assembly jobs referred to, it is not unusual to find that the same or better results may be had at a fuel consumption 65% to 75% of that formerly required.

The substitution of a complete new plant involves the scrapping of the old inefficient plant usually long before either the furnace or the burner are worn out, and incurs a very substantial capital expense. While there is great economy in operating cost with the substituted plant, the fixed costs are so high that it takes several years (for example 7 to 10) to amortize the cost before the user receives financial advantage. For reasons such as these, the inefficient plants continue to operate at great expense for fuel and causing depletion of the oil supply.

The present invention contemplates the use of economizers with such inefficient furnaces. These economizers are used with the existing installation—whether hot air, hot water, or steam —and fired with any of the common forms of forced draft oil burners, with no change to the furnace and but slight if any change to the burner.

According to the present invention, the economizer is interposed between the smoke pipe of the furnace and the stack so that the combustion gases are forced through a circuitous path, and the fresh air for the forced draft is caused to pass through an insulated air chest surrounding the piping for the stack gases, and a conduit, also preferably insulated, so that very hot fresh air is forced into the combustion chamber.

This hot air assists in vaporizing the fuel and promotes combustion at a high temperature so that much less fuel is needed to provide the heat output to satisfy the demand. The heating of the air for combustion abstracts heat from the discharged gases and as a result the gases discharged to the stack from the economizer are much cooler than formerly.

Other and further objects will appear as the description proceeds.

The accompanying drawings show, for purposes of illustrating the present invention, one embodiment in which the invention may take form, it being understood that the drawings are illustrative of the invention rather than limiting the same.

In the drawings:

Figure 1 is a diagrammatic side elevational view of a heating plant and economizer;

Figure 1-A is a diagrammatic perspective view of the same;

Figure 2 is a horizontal sectional view taken on the line 2—2 of Fig. 1-A, showing a motor operated blower and gun type burner installed;

Figure 3 is a vertical sectional view on the plane 3—3 of Fig. 1-A, showing the economizer;

Figure 4 is a vertical sectional view on the line 4—4 of Fig. 3; and

Figure 5 is a horizontal sectional view on the line 5—5 of Fig. 3.

In the drawings a conventional heating furnace is indicated at 10 and the usual chimney at 11. The furnace has the usual combustion chamber 12 and is fired by an oil burner 13 here shown as a conventional gun type burner. The furnace is of usual construction and for steam or hot water has the usual water space and smoke passages and the usual smoke pipe connection 14, 14'. Heating plants such as just described are in common use, the smoke pipe 14' being direct connected to the stack. Similar heating plants for hot air are also in use. These are usual conversion installations wherein an existing coal fired furnace has been adapted for burning oil by providing some form of oil burner, and such furnaces, as above pointed out, have low efficiency because, among other things, the stack losses are excessive.

According to the present invention, the passage between smoke pipe 14 and the chimney 11 is interrupted to receive the economizer shown in detail in the drawings.

In the drawings, the paths of the combustion products from the smoke pipe of the furnace to the chimney are indicated by dotted arrows, while the paths of the fresh air to be supplied to the burner are indicated by full line arrows. The furnace end 14 of the smoke pipe is connected to a crossing 20 having an inlet opening at 21, and an outlet opening at 22 to the right, a rear opening 23 to the pipe 14' and an opening 24 to the left, and carries a damper 25 adapted to extend diagonally of the crossing as indicated in Figure 5. This damper serves to divert all the hot gases coming from the furnace and smoke pipe 14 to the right to the discharge opening 22 and makes the crossing the equivalent of two elbows.

The discharge opening 22 is connected by piping 25 with an elbow 26 extending to the right and downwardly. This elbow discharges the products of combustion into a vertical downwardly extending pipe 27 which is connected through an elbow 28 with horizontally extending piping indicated at 29, which in turn is connected with a T 30 and an upwardly extending length of piping 31. The piping 31 is connected by an elbow 32 and piping 33 with the branch 24 of the crossing 20. The piping arrangement just described will, it is seen, provide a continuous passage for products of combustion through which they circulate as shown by the dotted arrows in the drawings and pass from the smoke pipe of the furnace to the inlet pipe for the chimney. This piping forming an inner piping loop for the combustion gases may be made of conventional smoke pipe elbows, sleeves, tees and the like.

In the economizer, this inner piping loop is received in an outer piping loop which may conveniently be made out of flat sheet metal parts and tubes. The outer piping loop forms an air chest through which air is drawn by the blower of the burner. It has a bottom portion 35 shown as a rectangular cross-section, an upper portion 36 also shown as a rectangular cross-section, and two vertical portions 37 and 38 conveniently in the form of tubes. Suitable cross braces and supports between the inner and outer piping loops are employed, but for clearness are omitted from the drawings.

In the form shown, the bottom portion 35 has a partition 40 to the right of the center line, this partition closing off the air chest outside the pipe 29. To the left of this partition, the air chest is provided with an inlet pipe 41. Air is admitted into this pipe as indicated by the full line arrows of the drawing and then passes through a perforated diaphragm 42 up through the tube portion 38 past radiating fins 43 carried by the pipe 31. The air is then drawn across the top of the economizer down through the tube 37 past fins 44 carried by the down pipe 27 for the flue gases, and then out through an outlet or suction connection 45. This outlet or suction connection 45 is continued in the form of the conduit 46 to a housing 47, the lower portion of which is connected to the chamber in which the impeller blades of the blower operate. In order to control the amount of air drawn in through the pipe 46, the housing 47 carries a damper 48, adjustable back and forth by thumb nuts 49, 49 on a threaded rod 50. The damper 48 is guided by studs 51, 51 carried by the housing 47.

In order to provide for cooling of the motor M used in operating the blower, the inlet 41 of the economizer is connected by a conduit 52 with a housing 53 about the motor. To assist in cooling the motor, it may be provided with cooling fins 54.

Where the present economizer is to be applied to an existing installation, no change need be made in the furnace or in the burner itself, except that the intake of the blower for the burner is connected to the suction conduit 46 in some convenient manner dependent upon the particular design of the burner which happens to be in use with the furnace. Also, where the motor for operating the blower is mechanically mounted with respect to the blower and forced draft passages so as to be unduly heated from the same, it is sometimes desirable to provide auxiliary cooling for the motor. This may be done by providing the motor with radiating fins indicated at 54.

The economizer may be constructed as a complete unit ready for installation between the smoke pipe of the furnace and the inlet pipe to the stack. A very convenient form of design is that indicated in the drawings in which it is in an upright position behind the furnace and in front of the chimney. Where an installation cannot be made in such a position, the entire economizer may be turned to the right or left from the position shown in Figure 1-A, approximately about the axis of the smoke pipe 14' so that the rectangular chests 35 and 36 are vertical and the tubular portions 37 and 38 are horizontal, or the entire economizer may be arranged so that the chests 35 and 36 and the pipes 37 and 38 form a horizontal loop.

In all cases, the outside surfaces of the economizer are provided with insulation such as indicated by the letter I so as to cut down heat losses from the large surfaces employed. The conduit 46 and the housing 47 are also similarly insulated.

In operation, the combustion products from the furnace circulate through the economizer in the same direction as that in which the fresh air for forced draft is circulated. The intake for the fresh air is in a region of the outer loop substantially opposite the smoke pipe connections so that the cold air taken in passes alongside the cooler portions of the piping in the economizer and then passes by the hotter portions of the pipes in the economizer so as to pick up heat energy from the combustion gases.

Comparative tests run on two conversion furnaces substantially alike, with like load, one with the economizer and one without the economizer, have shown very substantial fuel economies. These tests show that substantially one-third less fuel is required where the economizer is in use for doing a heating job equal to that of the similar furnace without the economizer. It has been found possible to so preheat the air for combustion that the air delivered to the blower of the burner can have temperatures of upwards of 450° F. By abstracting this amount of heat energy from the gases which would otherwise go to the stack, it is possible to operate the furnace in a much more efficient manner and get very substantial operating economies.

While the showing specifically illustrates a steam or hot water boiler with gun type burner, it is obvious that the arrangement may be used with various other forms of forced draft oil burners such as in hot air heating furnaces.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In combination, a chimney, a furnace, an oil burner unit including a motor operated blower for providing draft to the combustion space of the furnace, an economizer having a passage between the furnace and chimney and through which products of combustion pass, the economizer having a fresh-air-passage with inlet and outlet so disposed that the combustion gases and fresh air circulate in heat exchange relation, a suction conduit connecting the fresh air outlet of the economizer and the blower to withdraw heated fresh air from the economizer and deliver it to the combustion chamber as forced draft, and an intake suction conduit connecting the fresh air inlet of the economizer, the inlet of said last named conduit receiving the motor so that fresh air passes by the motor to cool it.

2. The combination as claimed in claim 1 wherein said intake suction conduit inlet is provided with heat conductive fins engaging the motor so that fresh air entering said inlet passes in heat exchange relation with said fins.

3. An economizer system for use in combination with a chimney, a furnace, an oil burner unit including a motor operated blower for providing draft to the combustion space of the furnace and a conduit forming a passage between the furnace and the chimney and through which products of combustion pass, comprising ducts forming a fresh air passage and a passage for combustion gases, said last mentioned passage being adapted to be interposed in said passage between the chimney and the furnace, said ducts being positioned so that the combustion gases and fresh air circulate in heat exchange relation, a suction conduit adapted to connect the fresh air passage of the economizer system and the blower to withdraw heated fresh air from the economizer system and deliver it to the combustion space as forced draft, and an intake suction conduit connecting the fresh air passage of the economizer system, the intake suction conduit being provided with an inlet internally provided with heat conducting fins adapted to receive and engage the motor so that fresh air entering said suction conduit inlet is adapted to pass in heat exchange relationship with said fins to cool the motor.

4. A fuel economizing heating plant comprising a forced draft oil burner provided with a motor-driven blower, a furnace having a combustion chamber into which the burner discharges, and a smoke pipe into which the gases, due to relatively low efficiency of heat transfer in the furnace, are discharged therefrom at an exceedingly high temperature upwards of substantially 700° F., a chimney, a heat exchanger interconnecting the furnace smoke pipe and the chimney and having a conduit for leading the hot combustion gases from the flue through the heat exchanger to the chimney and discharging them to the chimney at substantially reduced temperature, the heat exchanger having an intake for cool fresh air and a second independent conduit for leading through the exchanger for heating therein all the fresh air entering through the intake and leading all the thus heated fresh air from the heat exchanger to the blower, the portion of the conduit leading to the blower being insulated to prevent substantial drop in temperature of the air delivered to the combustion chamber of the furnace, the heat exchanger intake and second conduit being characterized by the substantial absence of obstructions to the free suction flow of fresh air from the intake to the blower, and the described movement of fresh air through the intake and through the heat exchanger to the furnace being effected solely by said blower, so that substantially the entire heat energy abstracted from the excessively hot furnace gases is restored to the fresh air supplied to the combustion chamber.

WILMER J. CARLSON.

REFERENCES CITED

The following references are of record in the file of this patent:

UNITED STATES PATENTS

| Number | Name | Date |
|---|---|---|
| 1,649,696 | Hodges | Nov. 15, 1925 |
| 1,848,672 | Simmons | Mar. 8, 1932 |
| 2,178,268 | Riehl | Oct. 31, 1939 |